US007790300B2

(12) United States Patent
Suzuki et al.

(10) Patent No.: US 7,790,300 B2

(45) Date of Patent: Sep. 7, 2010

(54) R-FE-B BASED THIN FILM MAGNET AND METHOD FOR PREPARATION THEREOF

(75) Inventors: Shunji Suzuki, Shizuoka (JP); Kenichi Machida, Osaka (JP); Eiji Sakaguchi, Kyoto (JP); Kazuya Nakamura, Saitama (JP)

(73) Assignees: Japan Science and Technology Agency, Saitama (JP); Hitachi Metals, Ltd., Tokyo (JP); Namiki Precision Jewel Co., Ltd., Tokyo (JP)

( * ) Notice: Subject to any disclaimer, the term of this patent is extended or adjusted under 35 U.S.C. 154(b) by 183 days.

(21) Appl. No.: 10/593,624

(22) PCT Filed: Mar. 23, 2005

(86) PCT No.: PCT/JP2005/005183

§ 371 (c)(1),
(2), (4) Date: Apr. 19, 2007

(87) PCT Pub. No.: WO2005/091315

PCT Pub. Date: Sep. 29, 2005

(65) Prior Publication Data

US 2007/0199623 A1 Aug. 30, 2007

(30) Foreign Application Priority Data

Mar. 23, 2004 (JP) ............................ 2004-085806

(51) Int. Cl.
*B32B 15/00* (2006.01)

(52) U.S. Cl. ................. 428/692.1; 428/693.1; 148/101; 148/102; 148/103

(58) Field of Classification Search ............... 428/692.1
See application file for complete search history.

(56) References Cited

U.S. PATENT DOCUMENTS 5,194,098 A * 3/1993 Sagawa et al. .............. 148/302

(Continued)

FOREIGN PATENT DOCUMENTS

JP 7-201623 A 8/1995

(Continued)

OTHER PUBLICATIONS

International Search Report mailed Jul. 5, 2005 of International Application PCT/JP2005/005183.

(Continued)

*Primary Examiner*—Mark Ruthkosky
*Assistant Examiner*—Gary D. Harris
(74) *Attorney, Agent, or Firm*—Westerman, Hattori, Daniels & Adrian, LLP

(57) ABSTRACT

An R—Fe—B based thin film magnet including an R—Fe—B based alloy which contains 28 to 45 percent by mass of R element (where R represents at least one type of rare-earth lanthanide elements) and which is physically formed into a film, wherein the R—Fe—B based alloy has a composite texture composed of $R_2Fe_{14}B$ crystals having a crystal grain diameter of 0.5 to 30 μm and R-element-rich grain boundary phases present at boundaries between the crystals. The magnetization characteristics of the thin film magnet are improved. The R—Fe—B based thin film magnet can be prepared by heating to 700° C. to 1,200° C. during physical film formation or/and the following heat treatment, so as to grow crystal grains and form R-element-rich grain boundary phases.

3 Claims, 3 Drawing Sheets

U.S. PATENT DOCUMENTS

| | | | | |
|---|---|---|---|---|
| 6,875,522 | B2 * | 4/2005 | Seto et al. | 428/611 |
| 7,285,338 | B2 * | 10/2007 | Yamashita et al. | 428/668 |
| 2004/0094237 | A1 * | 5/2004 | Nomura et al. | 148/302 |

FOREIGN PATENT DOCUMENTS

| | | | |
|---|---|---|---|
| JP | 07-201623 | A | 8/1995 |
| JP | 7-272929 | A | 10/1995 |
| JP | 07-272929 | A | 10/1995 |
| JP | 07-283016 | A | 10/1995 |
| JP | 7-283016 | A | 10/1995 |
| JP | 08-83713 | A | 3/1996 |
| JP | 9-45567 | A | 2/1997 |
| JP | 09-45567 | A | 2/1997 |
| JP | 11-273920 | A | 10/1999 |
| JP | 11-288812 | A | 10/1999 |
| JP | 2001-217124 | A | 8/2001 |
| JP | 2001-274016 | A | 10/2001 |
| JP | 2002-164238 | A | 6/2002 |
| JP | 2003-64454 | A | 3/2003 |
| JP | 2003-158006 | A | 5/2003 |
| JP | 2004-120892 | A | 4/2004 |

OTHER PUBLICATIONS

English translation of International Preliminary Report on Patentability for PCT/JP2005/005183 mailed on Jan. 18, 2007.

T. Okuda, "Synthesis of Nd-Fe-B Thin-Film-Magnet Material with Perpendicular Magnetic Anisotropy by Heat Treatment", Nagoya Institute of Technology, Nov. 10, 2003, pp. 1007-1012, vol. 27.

Sagawa, M. et al., "New Material for Permanent Magnets on a Base of Nd and Fe (Invited)", Journal of Applied Physics, Mar. 15, 1984, pp. 2083-2087, vol. 55, No. 6, American Institute of Physics.

Homburg, H. et al., "Sputtered NdFeB-Films of High Coercivity", Journal of Magnetism and Magnetic Materials, 1990, pp. 231-233, vol. 83, Elsevier Science Publishers B.V.

Yang, C. et al., "Magnetic Properties of NdFeB Thin Films Synthesized Via Laser Ablation Processing", Journal of Applied Physics, Jun. 1, 1998, (Abstract), vol. 83.

Jiang, H. et al., "Coercitivity and Its Temperature Dependence in NdFeB thin Films with Cr, Mo, Ti or Ta Buffer Layers", Journal of Applied Physics, May 1, 2000, (Abstract) vol. 87.

Rieger, G. et al., "Nd-Fe-B Permanent Magnets (thick films) Produced by A Vacuum-Plasma-Spraying Process", Journal of Applied Physics, May 1, 2000, pp. 5329-5331, vol. 87, No. 9, American Institute of Physics.

Lileev A. S. et al., "Properties of Hard Magnetic Nd-Fe-B Films Versus Different Sputtering Conditions", Journal of Magnetism and Magnetic Materials, 2002, pp. 1300-1303, vol. 242-245, Elsevier Science B.V.

Nakano M. et al., "Magnetic Properties of Nd-Fe-B Thick-Film Magnets Prepared by Laser Ablation Technique", IEEE Transactions of Magnetics, Sep. 2002, pp. 2913-2915, vol. 38, No. 5, IEEE.

Serrona, L.K.E.B. et al., "Structure and Magnetic Properties of High Coercive NdFeB Films with a Perpendicular Anisotropy", Applied Physics Letters, Mar. 17, 2003, pp. 1751-1753, vol. 82, No. 11, American Institute of Physics.

Okuda T. et al., "Nd-Fe-B Thin Films with Perpendicular Magnetic Anisotropy and High Coercivity Prepared by Pulsed Laser Annealing", Japanese Journal of Applied Physics, 2003, pp. 6859-6864, vol. 42, No. 11, Part 1.

Okuda T., "Synthesis of Nd-Fe-B Thin-Film-Magnet Material with Perpendicular Magnetic Anisotropy by Heat Treatment," Journal of Japanese Applied Magnetics Association, 2003, pp. 1007-1008, vol. 27, No. 10.

* cited by examiner

R-FE-B BASED THIN FILM MAGNET AND METHOD FOR PREPARATION THEREOF

TECHNICAL FIELD

The present invention relates to a high-performance thin film magnet suitable for the use in micromachines, sensors, and small medical and information equipment and a method for preparation thereof.

BACKGROUND ART

Rare-earth sintered magnets of Nd—Fe—B base primarily containing Nd as the rare-earth element R have high magnetic characteristics and have been used in VCMs (voice coil motors), MRIs (magnetic resonance imaging apparatuses), and other various fields. These magnets have sizes with one side of several millimeters to several tens of millimeters. Cylindrical magnets having outer diameters of 3 mm or less are used in vibration motors for cellular phones, and further minute magnets are required in the fields of micromachines and sensors. For example, a flat-shaped magnet having a thickness of 1 mm or less is prepared through the steps of cutting from a somewhat large sintered block, polishing, or the like in advance. However, it is difficult to produce a magnet of 0.5 mm or less because of a magnetic strength problem or a productivity problem.

On the other hand, recently, thin film magnets in minute sizes have become prepared by physical film formation methods, e.g., sputtering and laser deposition, and for the magnetic characteristics, a maximum energy product of 200 kJ/m or more has been reported (for example, Non-Patent Document 1 and Patent Document 1). According to these preparation methods, magnet alloy components are deposited on substrates or shafts in a vacuum or in a space at a reduced pressure, and are subjected to a heat treatment, so that a high performance film exhibiting about 200 kJ/m can be produced by a simple process relative to a sintering method by appropriately controlling various conditions.

As a general example, the thickness of the thin film magnet formed on a base material, e.g., a flat plate or a shaft, is about several micrometers to several tens of micrometers, and in many cases, it is one-several tenth to one-hundredth of the four sides of the flat plate or the diameter of the shaft. When this thin film is magnetized in a direction perpendicular to the flat plate surface or the circumferential surface of the shaft, a demagnetizing field is increased significantly, and adequate magnetization is not performed. Therefore, it becomes difficult to exploit the magnetic characteristics inherent in the thin film magnet. It has been generally known that the magnitude of the demagnetizing field depends on the ratio of the dimension of magnet in the magnetization direction to the dimension in the direction orthogonal thereto, and is increased as the dimension in the magnetization direction (=film thickness direction) is decreased.

On the other hand, if an easy-to-magnetize magnet material can be prepared from a point of view different from the above-described dimensional ratio problem, it becomes possible to exploit the characteristics of the thin film magnet easily. Consequently, the usefulness is exerted in preparation of various application devices. In a method generally adopted for known Nd—Fe—B based thin film magnet, components constituting the magnet are deposited in an atomized or ionized state on a base material, and $Nd_2Fe_{14}B$ crystal grains of less than 0.3 μm corresponding to a single-magnetic-domain grain diameter are generated by the following heat treatment (Patent Documents 2 and 3).

At this time, in general, it is a common means to control the crystal grains at small size so as to obtain desired magnetic characteristics (for example, Patent Document 4). However, there is almost no document in which the crystal grain diameter and the magnetization characteristics are discussed. If the crystal grains are grown to 0.3 μm or more, the inside of each crystal grain takes on a multidomain structure and, thereby, the coercive force is reduced.

For the purposes of reference to evaluation of the magnetization characteristics, FIG. 1(*a*) shows an initial magnetization curve and a demagnetization curve of a general sintered magnet, and FIG. 1(*b*) shows an initial magnetization curve and a demagnetization curve of a known example of thin film magnet. As is clear from FIG. 1(*a*), when a magnetic field is applied to the sintered magnet, the magnetization rises steeply, and adequately high magnetization characteristics are exhibited even when the magnetic field is at a low level of about 0.4 MA/m.

On the other hand, for the thin film magnet of a known example shown in FIG. 1(*b*), the magnetization is increased gradually from an origin point, and no tendency of saturation is observed even at a magnetic field of 1.2 MA/m. The reason for this difference in magnetization characteristics is estimated that the sintered magnet has a nucleation type coercive force mechanism whereas the thin film magnet of the known example is based on the single-magnetic-domain grain type coercive force generation mechanism.

Non-Patent Document 1: Journal of Magnetics Society of Japan, Vol. 27, No. 10, 1007, (2003)

Patent Document 1: Japanese Unexamined Patent Application Publication No. 8-83713

Patent Document 2: Japanese Unexamined Patent Application Publication No. 11-288812

Patent Document 3: Japanese Unexamined Patent Application Publication No. 2001-217124

Patent Document 4: Japanese Unexamined Patent Application Publication No. 2001-274016

DISCLOSURE OF INVENTION

Problems to be Solved by the Invention

It is an object of the present invention to improve the magnetization characteristics of a thin film magnet.

Means for Solving the Problems

The inventors of the present invention have conducted intensive research on the composition and the crystal texture for the purpose of improving the magnetization characteristics of the thin film magnet and, as a result, succeeded in the preparation of a thin film magnet having a nucleation type coercive force mechanism similar to that of the sintered magnet.

An aspect of the present invention is (1) an R—Fe—B based thin film magnet characterized by including an R—Fe—B based alloy which contains 28 to 45 percent by mass of R element (where R represents at least one type of rare-earth lanthanide elements), which has a film thickness of 0.2 to 400 μm, and which is physically formed into a film on a substrate, wherein R—Fe—B based alloy has a composite texture composed of $R_2Fe_{14}B$ crystals having a crystal grain diameter of 0.5 to 30 μm and R-element-rich grain boundary phases present at boundaries between the crystals.

Another aspect of the present invention is (2) the R—Fe—B based thin film magnet according to the above-described item (1), characterized in that c axes, which are easy-to-magnetize axes, of $R_2Fe_{14}B$ crystals are oriented randomly or oriented nearly perpendicularly to a film surface.

Another aspect of the present invention is (4) a method for preparation of the R—Fe—B based thin film magnet according to the above-described item (1) or (2), the method characterized by including the step of heating the R—Fe—B based alloy to 700° C. to 1,200° C. during physical film formation or/and the following heat treatment, so as to grow crystal grains and form R-element-rich grain boundary phases.

In the case where the crystal texture of the Nd—Fe—B based thin film magnet is almost composed of $R_2Fe_{14}B$ crystals and the crystal grain diameter thereof is less than a single-magnetic-domain grain diameter corresponding to 0.3 μm, even when a magnetic field is applied, the magnetization direction of each crystal grain gradually rotates relative to the magnitude of the magnetic field and, thereby, adequate magnetization is difficult, as indicated by the initial magnetization curve of the thin film magnet of the known example shown in FIG. 1(*b*). In many cases, the thin film magnets are applied to minute devices and, therefore, it is practically difficult to apply a large magnetic field to a minute section.

On the other hand, in the case of the magnet according to the present invention where the crystal texture is composed of a composite texture including $R_2Fe_{14}B$ crystals larger than the single-magnetic-domain grain diameter and R-element-rich grain boundary phases present at boundaries between the crystals, when a magnetic field is applied, as is estimated from an initial magnetization curve of Present invention sample (2) shown in FIG. 3 described below, many magnetic domains present in each crystal grain are oriented in unison to the direction of the magnetic field by a small magnetic field while adjacent magnetic walls are removed, and adequate magnetization similar to that in the sintered magnet is performed. It is estimated that the difficulty and easiness of the magnetization characteristics result from the grounds that the thin film magnet of the known example has the single-magnetic-domain grain type coercive force generation mechanism whereas the thin film magnet according to the present invention has a nucleation type coercive force generation mechanism.

BEST MODE FOR CARRYING OUT THE INVENTION (Alloy System•Crystal Texture)

The thin film magnet, which is an object of the present invention, is composed of an R—Fe—B based alloy, where a rare-earth element is denoted by R. In general, a Nd—Fe—B based alloy is used. In actual preparation of the alloy, in order to improve the coercive force of the thin film magnet, Pr, Dy, Tb, or the like is added as the R element besides Nd, and inexpensive Ce is added, for example. Furthermore, usually, various transition metal elements, e.g., Ti, V, Mo, and Cu, P, Si, and Al are added in order to appropriately control the crystallization temperature and the crystal grain size of the alloy to be formed into a film, and various transition metal elements, e.g., Co, Pd, and Pt, are added in order to improve the corrosion resistance.

The total amount of the rare-earth elements R, e.g., Nd, Pr, Dy, and Tb, in the alloy must be 28 to 45 percent by mass to form the composite texture composed of $R_2Fe_{14}B$ crystals and R-element-rich grain boundary phases, and 32 to 40 percent by mass is more preferable. That is, the content of the R element in the alloy must be larger than that of the $R_2Fe_{14}B$ composition. It is estimated that the R-element-rich grain boundary phase is a phase similar to an $RO_2$ or $R_2O_3$ type oxide containing 50 percent by mass or more of R element and small amounts of Fe and other additional components.

The amount of Nd in the stoichiometric composition of $Nd_2Fe_{14}B$, in which Nd is taken as a typical example of the R element, is 26.7 percent by mass, and the content of the R element in the alloy must be at least 28 percent by mass in order to allow a small amount of Nd-element-rich grain boundary phases to coexist. On the other hand, as the amount of the R element is increased, the proportion of the grain boundary phases in the alloy is increased and, therefore, the coercive force is improved. However, the proportion of $Nd_2Fe_{14}B$ crystals is decreased, the magnetization is decreased significantly and, thereby, high magnetic characteristics cannot be obtained. Consequently, the content of the R element must be 45 percent by mass or less.

With respect to the relationship between the $Nd_2Fe_{14}B$ crystals and the Nd-rich grain boundary phases in the inside of the alloy, in the texture, the former crystals are almost surrounded by the latter grain boundary phases, as in the sintered magnet. In the case where the proportion of the grain boundary phases is small, the thickness thereof is decreased to about 10 nm, and the grain boundary phase is partly missed in the texture. Therefore, there is a tendency toward a lower coercive force and higher magnetization. In the case where the proportion is large, the thickness becomes several hundred nanometers to 1 micrometer, and there is a tendency toward a higher coercive force and lower magnetization.

In general, the crystal grain diameter is determined by averaging dimensions of cross-sections of the crystal cut in various directions. When the film thickness is small, flat-shaped crystals are formed. Therefore, in the present specification, the average dimension of crystals observed in a film surface is referred to as a crystal grain diameter. In this measuring method, specifically, the Nd—Fe—B based thin film formed on a flat substrate or a shaft surface is slightly etched with nitric acid alcohol, and the resulting sample is observed with SEM (scanning electron microscope) or a high-powered metallurgical microscope. One line is drawn on the resulting image photograph, crystal grain diameters on the line within a length of 200 μm are measured, and a calculated average value is taken as the crystal grain diameter.

The grain diameter of the $Nd_2Fe_{14}B$ crystal must be 0.5 to 30 μm in order to have a nucleation type coercive force mechanism and make the rising edge of the magnetization steep relative to a magnetic field, and 3 to 15 μm is more preferable. As described above, if the grain diameter is less than 0.5 μm, the dimension becomes close to the single-magnetic-domain grain diameter, the rising edge of the initial magnetization curve becomes gentle and, thereby, it becomes difficult to magnetize. On the other hand, if the grain diameter exceeds 30 μm, the number of magnetic domains present in one crystal becomes too large, inversion of magnetization tends to occur and, thereby, a necessary coercive force cannot be obtained even when the grain boundary phases are formed.

In the R—Fe—B based thin film magnet according to the present invention, the c axes, which are easy-to-magnetize axes, of $R_2Fe_{14}B$ crystals are oriented randomly or oriented nearly perpendicularly to a film surface. In the present invention, basically the magnetization characteristics are improved regardless of whether the c axes are oriented or not. However, in the case where the c axes are parallel to the film surface, the influence of a demagnetizing field is small and an effect of improving the magnetization characteristics is reduced.

(Film Thickness•Film Formation Method•Base Material)

When the thickness of the Nd—Fe—B based film is within the range of 0.2 to 400 μm, the effect of the present invention can be exerted adequately. If the thickness is less than 0.2 μm, the volume of the $Nd_2Fe_{14}B$ crystal grain is decreased and, thereby, single-magnetic-domain grain-like behavior becomes dominant even when the composite texture composed of $Nd_2Fe_{14}B$ crystals and the Nd-rich grain boundary phases is formed. Consequently, good magnetization characteristics cannot be obtained. On the other hand, if the thickness exceeds 400 μm, variations in size of crystal and orientation are increased in the upper portion and the lower portion of the film, so that the residual magnetization is reduced. Furthermore, a long-duration operation of about 1 day or more is required to form a film having a thickness exceeding 400 μm, and the thickness exceeding 400 μm can be relatively easily obtained by a method in which a sintered magnet is cut and polished. Therefore, the upper limit of the thickness is specified to be 400 μm.

With respect to the film formation method, plating in which an alloy is deposited from a liquid, coating in which fine alloy powder particles are applied or sprayed, CVD, and various physical film formation methods, e.g., evaporation, sputtering, ion plating, and laser deposition, can be used. In particular, the physical film formation methods are suitable for use as a film formation method of the Nd—Fe—B based thin film because contamination of impurities is at a low level and a crystalline film exhibiting good quality can be obtained.

With respect to the base material for forming the thin film, various metals, alloys, glass, silicon, ceramic, and the like can be selected and used. However, since a treatment at a high temperature is required in order to obtain a desired crystal texture, it is desirable that ceramic or a high-melting point metal, e.g., Fe, Mo, or Ti, as a metal base material is selected. In the case where the base material has soft magnetism, metals, e.g., Fe, magnetic stainless steel, and Ni, and alloys are suitable, because the demagnetizing field of the thin film magnet becomes small. When a ceramic base material is used, adequate resistance is exhibited in the high temperature treatment. However, the adhesion to the Nd—Fe—B film may be inadequate. As a measure against it, usually, the adhesion is improved by providing a substrate film formed from Ti, Cr, or the like. These substrate films may be useful for base materials formed from metals and alloys.

(Heat Treatment)

In the state of being formed into a film by sputtering or the like, the Nd—Fe—B based film is usually composed of amorphous or fine crystals on the order of several tens of nanometers, in many cases. Heretofore, crystallization and growth of crystal are facilitated by a low-temperature heat treatment at 400° C. to 650° C. and, thereby, a crystal texture of less than 1 μm is obtained. In the present invention, it is necessary that crystal grains larger than ever are prepared as a first step, and a high-temperature heat treatment is performed at 700° C. to 1,200° C. as a second step in order to allow the Nd-rich grain boundary phases to coexist.

The role of this high-temperature heat treatment is to facilitate the growth of $Nd_2Fe_{14}B$ crystal grains in the film and generate Nd-rich grain boundary phases around the crystals simultaneously. When this structure is established, the nucleation type coercive force mechanism, which is an object of the present invention, is provided. Preferably, a low-temperature heat treatment at 500° C. to 600° C. is performed following the high-temperature heat treatment. Consequently, the above-described Nd-rich grain boundary phases form a thin texture uniformly surrounding the crystals and, as a result, an effect of improving the coercive force is exerted.

Preferably, the base material temperature during the film formation is controlled at 300° C. to 400° C., and after the film formation, heating to 700° C. to 1,200° C. is performed. If the temperature is lower than 700° C., it takes about several tens of hours to grow desired crystal grains and, therefore, this is not appropriate. Furthermore, it is very difficult to generate Nd-rich grain boundary phases. When the temperature is 700° C. or higher, the growth of crystal proceeds and, in addition, Nd-rich grain boundary phases are formed through various reactions of Nd, Fe, and B. However, if the temperature exceeds 1,200° C., a part of the alloy is brought into a state of melt and, thereby, the thin film form loses its shape. In addition, oxidation proceeds significantly. Therefore, this is not appropriate.

In both heat treatments at a high temperature and a low temperature to obtain a homogeneous crystal texture, if the heat treatment time is 10 minutes or less, unevenness of crystal grain diameters or variations in the thickness of the Nd-rich grain boundary phases tend to occur in the film. On the other hand, since the volume of the thin film magnet is small as compared with the volume of the sintered magnet, a desired crystal texture and grain boundary phase can easily be obtained in ten-odd minutes to several tens of minutes, the treatment for 1 hour or more causes proceeding of oxidation, and an influence to the crystal texture is relatively small even when the time is increased. Consequently, it is preferable that the treatment time is more than 10 minutes, and less than 1 hour.

It is preferable that the heat treatment is performed in a vacuum or in a non-oxidizing atmosphere after the film formation. For the heating method, a system in which the thin film sample is charged into an electric furnace, a system in which rapid heating and cooling is performed by infrared heating or laser irradiation, a Joule heating system in which the thin film is energized directly, or the like can be selected and adopted.

It is preferable that the film formation and the heat treatment are performed separately, because the crystallinity and magnetic characteristics of the film can easily be controlled. However, a system in which the base material is heated to a high temperature during sputtering can be used. It is also possible to prepare a desired crystal texture by increasing an output in the film formation and, thereby, maintaining the temperature during the film formation at a high temperature. Since the Nd—Fe—B based film tends to rust, usually, a corrosion-resistant protective film is formed from Ni, Ti, or the like after the film formation or the heat treatment.

EXAMPLE 1

The present invention will be described below in detail with reference to examples.

A Nd—Fe—B alloy having a composition, in which the Nd content was less than that in an objective Nd—Fe—B alloy, was melted and cast, the inner perimeter, outer perimeter, and surface grinding was performed and, thereby, two annular alloys having an outer diameter of 60 mm, an inner diameter of 30 mm, and a thickness of 20 mm were prepared. Eight through holes having a diameter of 6 mm were disposed in an annular portion by electrical discharge machining so as to produce a target. A Nd rod having a diameter of 5.8 mm, a length of 20 mm, and a purity of 99.5% was separately prepared for adjusting the alloy composition. Furthermore, a plurality of iron plates having a purity of 99.9% in the shape of a strip having a length of 12 mm, a width of 5 mm, and a thickness of 0.3 mm were prepared, degreased with a solvent, and pickled so as to produce substrates. A film of a Nd—Fe—B alloy was formed on the resulting iron substrate surface by using a three-dimensional sputtering apparatus, in which a pair of the targets were opposed and a high-frequency coil was disposed therebetween.

An actual film formation operation was performed in accordance with the following procedure. The predetermined number of Nd rods were put into through holes of the Nd—Fe—B alloy target attached to the inside of the sputtering apparatus. The above-described substrate was attached to a jig directly coupled to a motor shaft in the apparatus, and was set in such a way as to be placed at the midpoint position of the high-frequency coil. The inside of the sputtering apparatus was evacuated to $5\times10^{-5}$ Pa. Thereafter, an Ar gas was introduced and the inside of the apparatus was maintained at 1 Pa. An oxide film on the iron substrate surface was removed by performing reverse sputtering for 10 minutes, while an RF output of 30 W and a DC output of 3 W were applied. Subsequently, sputtering was performed for 90 minutes, while an RF output of 150 W and a DC output of 300 W were applied and the substrate was rotated at 6 rpm, so that a Nd—Fe—B films having a thickness of 15 μm were formed on both surfaces of the substrate. The number of Nd rods was changed and similar sputtering was performed repeatedly, so that six Nd—Fe—B films, in total, having different alloy compositions were prepared.

The six substrates provided with films were cut into halves in the length direction. One side of the cut substrate was charged into an electric furnace disposed in a glove box, and was subjected to a two-stage heat treatment, in which a first stage was performed at 850° C. for 20 minutes and a second stage was performed at 600° C. for 30 minutes, in an Ar atmosphere, in which the oxygen concentration was maintained at 2 ppm or less. The resulting samples were taken as Present invention samples (1) to (4) and Comparative example samples (1) and (2) on the basis of the Nd compositions. The other half was simply subjected to a one-stage heat treatment at 600° C. for 30 minutes, so that Comparative example samples (3) to (8) were prepared.

As representative examples, Present invention sample (2) and Comparative example sample (5), which had the same Nd content and exhibited highest (BH)max values, were subjected to the crystal texture observation by using a scanning electron microscope (SEM) provided with an energy dispersive mass spectrograph (EDX). The crystal grain diameter of Present invention sample (2) determined by measuring the length in the observation image was 3 to 4 μm, and grain boundary phases having a thickness of 0.2 μm or less, in which Nd and O were distributed at high concentrations between individual crystal grains, were observed by the secondary electron image observation. On the other hand, the crystal grain diameter of Comparative example sample (5) was 0.2 μm or less and a clear grain boundary phase was not recognized.

In order to examine the direction of the c axis which was a easy-to-magnetize axis of the Nd—Fe—B crystal, a magnetism measurement was performed in two directions, perpendicular to the film formation surface and horizontal, for Present invention sample (2) and Comparative example sample (5). As a result, the residual magnetization of the former sample measured in the perpendicular direction was 1.6 times that in the horizontal direction. Therefore, it was clearly estimated that the c axis was oriented in the direction perpendicular to the film surface. Furthermore, the X-ray diffraction pattern of this sample was measured. As a result, the diffraction line intensity of a (006) surface resulting from the $Nd_2Fe_{14}B$ crystal was remarkable and, therefore, the above-described c axis orientation was ascertained. On the other hand, the residual magnetization of the latter sample was different depending on the direction, and the value measured in the perpendicular direction was 1.2 times that in the horizontal direction. However, since the crystal grains were too small, the orientation property of the c axis was somewhat inferior to that of the former sample.

The magnetic characteristics of individual samples were measured by using a vibrating sample type magnetometer, and measurements were performed in the case where a magnetic field of 1.2 MA/m was applied in a direction perpendicular to the film surface and in the case where 2.4 MA/m was applied. Subsequently, a measurement of the Fe substrate before film formation, which had been subjected to the heat treatment at the above-described temperature, was performed, the measurement value was subjected to subtraction processing and, thereafter, the magnetic characteristics of the Nd—Fe—B film were determined. A part of the samples were further subjected to the measurement of the initial magnetization curve. In every case, correction of demagnetizing factor was not considered.

In the alloy composition analysis of the thin film, since a commonly used ICP analysis included an error due to elution of the Fe substrate during dissolution of the film with an acid, the Nd content in the film was calculated on the basis of the EPMA analysis. As a result, the Nd content was 25.7 in terms of percent by mass for Comparative example sample (1), 29.4 for Present invention sample (1), 34.5 for Present invention sample (2), 39.2 for Present invention sample (3), 44.1 for Present invention sample (4), and 47.8 for Comparative example sample (2). For Comparative example samples (3) to (8), in which the heat treatment condition was different from those described above, since the Nd percent by mass is not changed by the difference in heat treatment, the values in correspondence with the above-described results of percent by mass were used. The mass of Nd and the heat treatment condition are collectively shown in Table 1.

TABLE 1

| | Nd composition (percent by mass) | Heat treatment temperature (° C.) |
|---|---|---|
| Comparative example sample (1) | 25.7 | 850 |
| Present invention sample (1) | 29.4 | 850 |
| Present invention sample (2) | 34.5 | 850 |
| Present invention sample (3) | 39.2 | 850 |
| Present invention sample (4) | 44.1 | 850 |
| Comparative example sample (2) | 47.8 | 850 |
| Comparative example sample (3) | 25.7 | 600 |
| Comparative example sample (4) | 29.4 | 600 |
| Comparative example sample (5) | 34.5 | 600 |
| Comparative example sample (6) | 39.2 | 600 |
| Comparative example sample (7) | 44.1 | 600 |
| Comparative example sample (8) | 47.8 | 600 |

FIG. 2 shows maximum energy products (BH)max of Present invention samples (1) to (4) and Comparative example samples (1) to (8). Here, the value measured while a low magnetic field of 1.2 MA/m was applied was denoted by (BH)max/1.2, and the value measured while a high magnetic field of 2.4 MA/m was applied was denoted by (BH)max/2.4.

As is clear from FIG. 2, (BH)max of every sample depended on the amount of Nd, and for Present invention samples (1) to (4) having the Nd mass of 28 percent or more, and 45 percent or less, both the obtained maximum energy products, (BH)max/1.2 and (BH)max/2.4, were high values of about 150 kJ/m or more. The difference between the two (BH)max values is small and, therefore, it was made clear that relatively high characteristics were able to be obtained by a low magnetization magnetic field. For Comparative example sample (1) in which the Nd percent by mass was too small, deposition of αFe was recognized in the crystal texture, so that the coercive force was low. Therefore, a high (BH)max was not able to be obtained. For Comparative example sample (2) in which the Nd percent by mass was too large, the residual magnetization was reduced significantly, so that a high (BH)max was not able to be obtained.

On the other hand, for Comparative example samples (3) to (8), the difference between the (BH)max/1.2 and the (BH) max/2.4 was large, a high value was not able to be obtained unless the magnetization magnetic field was increased, and a value of 150 kJ/m$^3$ was obtained simply in the case where a high magnetic field was applied, for Comparative example sample (5). This is on the grounds that, as indicated by the initial magnetization curves and the demagnetization curves of Present invention sample (2) and Comparative example sample (5) shown in FIG. 3, the former exhibits a steep rising edge of magnetization whereas that of the latter is gentle. The reason for this is estimated to be the difference in crystal texture.

EXAMPLE 2

In a front chamber of a three-dimensional sputtering apparatus, three Nd rods were put into each of one pair of Nd—Fe—B alloy targets prepared in Example 1, and a Ti target having the same dimensions was attached to a rear chamber. Surface-polished alumina having an outer diameter of 10 mm, an inner diameter of 0.8 mm, and a thickness of 0.2 mm was used as the substrate. The above-described alumina substrates were attached to a tungsten wire in such a way that five substrates were attached on one sputtering operation basis while keeping a distance of 7 mm from each other, the tungsten wire having a diameter of 0.5 mm and a length of 60 mm, being processed into a corrugated shape, and being inserted into a jig directly coupled to a motor shaft.

The inside of the sputtering apparatus was evacuated. Thereafter, an Ar gas was introduced, the inside of the apparatus was maintained at 1 Pa, and the substrate was rotated at 6 rpm. First, reverse sputtering was performed for 10 minutes, while an RF output of 100 W and a DC output of 10 W were applied. Subsequently, sputtering was performed for 10 minutes, while an RF output of 100 W and a DC output of 150 W were applied, so that Ti substrate films were formed on both surfaces of the substrate. The resulting substrate provided with Ti films formed thereon was transferred to the front chamber of the apparatus, and sputtering was performed for 80 minutes, while an RF of 200 W and a DC of 400 W were applied, so that Nd—Fe—B films were formed on both surfaces of the above-described substrate. Furthermore, the resulting substrates were charged into an electric furnace placed in an Ar gas atmosphere, and were heated at 600° C. to 1,250° C. for 30 minutes, followed by furnace cooling, so that various samples, in which crystal grain diameters were differentiated due to the difference in heat treatment temperature, that is, Reference sample, Present invention samples (6) to (9) and Comparative example samples (9) and (10) were prepared.

With respect to the thicknesses of individual films, a part of the substrate was masked in advance, a film was formed under the same sputtering condition, and measurement was performed with a surface roughness meter. As a result, a Ti film was 0.15 μM, and a Nd—Fe—B film was 20 μM. The amount of Nd in the Nd—Fe—B film was 33.2 percent by mass. Every sample after the heat treatment was observed by using the SEM apparatus provided with an EDX analysis function, and the $Nd_2Fe_{14}B$ crystal grain diameter was determined from the image thereof. According to the secondary electron image observation, in Present invention sample (6) to (9), grain boundary phases having a thickness of about 0.1 μm, in which Nd and O were distributed at high concentrations between individual crystal grains, were observed. On the other hand, in Comparative example samples (9) and (10), a clear grain boundary phase was not recognized.

Table 2 shows the heat treatment temperature, the crystal grain diameter, and the values of the residual magnetization Br/1.2 and the coercive force Hcj/1.2 in the case where a low magnetic field of 1.2 MA/m was applied in a direction perpendicular to the film surface of each sample.

TABLE 2

| Sample | Heat treatment temperature (° C.) | Crystal grain diameter (μm) | Br/1.2 (T) | Hcj/1.2 (MA/m) |
|---|---|---|---|---|
| Comparative example sample (9) | 600 | 0.2 | 0.58 | 1.18 |
| Present invention sample (5) | 700 | 0.7 | 0.83 | 1.22 |
| Present invention sample (6) | 800 | 3.1 | 1.03 | 1.15 |
| Present invention sample (7) | 900 | 9.2 | 1.18 | 1.12 |
| Present invention sample (8) | 1000 | 18 | 1.19 | 0.93 |
| Present invention sample (9) | 1200 | 28 | 1.16 | 0.74 |
| Comparative example sample (10) | 1250 | 35 | 0.87 | 0.38 |

As is clear from Table 2, when the heat treatment temperature is 700° C. or more, the crystal grain diameter exceeding the single-magnetic-domain grain diameter of 0.3 μm can be obtained, and as the temperature is increased, the crystal grows and the grain diameter is increased. For Comparative example sample (9), since the crystal grain diameter is small, the coercive force is large. However, the magnetization characteristics are poor and, thereby, the residual magnetization is low. For Comparative example sample (10), since the crystal grain diameter is too large, the coercive force is reduced significantly, and reduction of the residual magnetization results. Furthermore, a part of alloy component becomes melt, and unevenness occurs in the film surface.

FIG. 4 shows the relationship of the crystal grain diameter with (BH)max/1.2 and (BH)max/2.4 of each sample. According to FIG. 4, as the crystal grain diameter is increased, the value of (BH)max/1.2 becomes close to the value of (BH) max/2.4, that is, the tendency toward an improvement of the magnetization characteristics is shown. Furthermore, (BH) max/2.4 is 150 kJ/m$^3$ or more for Present invention sample (9) in which the crystal grain diameter is 28 μm, 200 kJ/m$^3$ or more for the samples (6) to (8), and 245 kJ/m$^3$ at a maximum. Therefore, a high maximum energy product was obtained.

EXAMPLE 3

Two Nd rods and one Dy rod were put into each of one pair of Nd—Fe—B alloy targets, two Fe substrates used in Example 1 were adhered and fixed to a jig, and they were attached to a sputtering apparatus. The inside of the apparatus was maintained at 0.5 Pa, and the substrate was rotated at 6 rpm. First, reverse sputtering was performed for 10 minutes, while an RF output of 30 W and a DC output of 4 W were applied. Subsequently, sputtering was performed for 0.5 minutes to 24 hours, while an RF of 200 W and a DC of 500 W were applied, so that a Nd—Dy—Fe—B film was formed on-one surface of each of the above-described two substrates. One of the substrates was used for measuring the film thickness, and the other was used for a heat treatment. In the heat treatment, the temperature of the substrate was rapidly raised to 820° C. by infrared heating in a vacuum, and was kept for 10 minutes, followed by cooling. The resulting samples were taken as Comparative example sample (11) of 0.15 μm, Present invention sample (10) of 0.26 μm to Present invention sample (16) of 374 μm, and Comparative example sample (12) of 455 μm on the basis of the film thicknesses.

As a result of the composition analysis of each sample, the amount of Nd in the Nd—Dy—Fe—B film was 29.8 percent by mass, Dy was 4.3 percent by mass, and a total amount of rare earth was 34.1 percent by mass. All the crystal grain diameters were within the range of 5 to 8 μm. According to the secondary electron image observation, in every sample, grain boundary phases having a thickness of about 0.2 μm or less, in which Nd and O were distributed at high concentrations between individual crystal grains, were observed.

FIG. 5 shows the relationship of the film thickness with (BH)max/1.2 and (BH)max/2.4 of each sample. As is clear from FIG. 5, in Comparative example sample (11) of 0.15 μm film thickness, since the film thickness is too small, the volume of the crystal is small and, thereby, a single-magnetic-domain grain-like behavior becomes dominant. Consequently, the magnetization characteristics are poor and, as a result, the difference between (BH)max/1.2 and (BH)max/2.4 is large. In Comparative example sample (12), since the film thickness is too large, disturbance in the perpendicular orientation property of the crystal is increased, and the tendency toward a reduction of (BH)max was shown. Therefore, it was made clear that the appropriate thickness of the film was 0.2 to 400 μm in order to obtain a high energy product.

EXAMPLE 4

A target was the same as the target in Example 3, and a SUS420 based stainless steel shaft having a diameter of 0.3 mm and a length of 12 mm was used as a base material. The inside of the apparatus was maintained at 1 Pa, and the base material was rotated at 10 rpm. Reverse sputtering was performed for 10 minutes, while an RF output of 20 W and a DC output of 2 W were applied. Sputtering was performed for 4 hours, while an RF of 200 W and a DC of 500 W were applied, so that two products, in which a Nd—Dy—Fe—B film of 46 μm was formed on the surface of the base material shaft, were prepared. Subsequently, the shafts provided with the film formed thereon were put in an electric furnace. One shaft was kept at 800° C. for 30 minutes, and the other shaft was kept at 550° C. for 30 minutes, followed by cooling. The former was taken as Present invention sample (17), and the latter was taken as Comparative example sample (13).

As a result of the composition analysis of each sample, the amount of Nd in the Nd—Dy—Fe—B film was 30.6 percent by mass, Dy was 4.4 percent by mass, and a total amount of rare earth was 35.0 percent by mass. The crystal grain diameter of Present invention sample (17) was 3 to 7 μm. According to the secondary electron image observation, grain boundary phases having a thickness of about 0.2 μm or less, in which Nd and O were distributed at high concentrations between individual crystal grains, were observed. On the other hand, the crystal grain diameter of Comparative example sample (13) was about 0.2 μm and a clear grain boundary phase was not recognized.

The measurement of the magnetic characteristics was performed by applying a magnetic field of 0.8 to 2.4 MA/m in a direction orthogonal to the shaft provided with the film formed thereon. As in Example 1, the characteristics of the sample, which was the shaft before film formation and had been subjected to a heat treatment at the same temperature, were subtracted and, thereafter, the magnetic characteristics of the Nd—Dy—Fe—B film were determined. When the results of measurement while a magnetic field was applied in a direction parallel to the shaft were compared with the above-described results, the values of residual magnetization were at an equivalent level. Therefore, it was estimated that a magnetically isotropic film was obtained for the present example sample.

FIG. 6 shows the relationship of the energy product with the magnetic field for Present invention sample (17) and Comparative example sample (13). As is clear from FIG. 6, since the difference in maximum energy product relative to the magnitude of the magnetic field was small, it was made clear that, for Present invention sample (17), a high value was able to be obtained at a low magnetic field as compared with Comparative example sample (13).

INDUSTRIAL APPLICABILITY

In the R—Fe—B based thin film magnet in which the R content and the crystal grain diameter were controlled, the composite texture composed of the $R_2Fe_{14}B$ crystals and R-element-rich grain boundary phases is formed and, thereby, the thin film magnet having excellent magnetization characteristics as compared with those of the known thin film magnet can be prepared. Consequently, thin film magnet suitable for the use in micromachines, sensors, and small medical and information equipment, in which it is difficult to generate a strong magnetic field in a narrow space, can be adequately magnetized and, therefore, an improvement of performance of various equipment is facilitated.

Figure 1A:
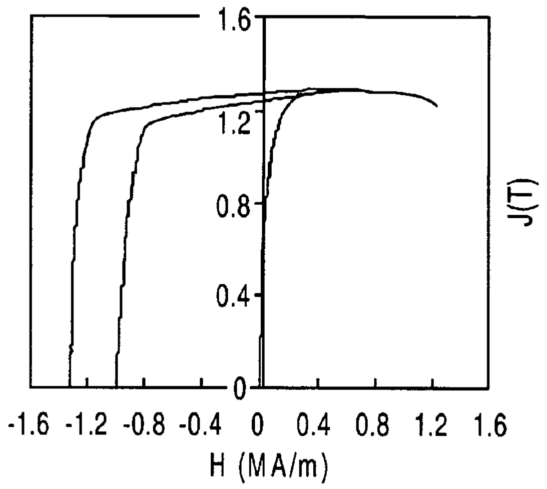
FIG. 1 is a diagram showing initial magnetization curves and demagnetization curves of a sintered magnet (a) and a known example of thin film magnet (b).
Figure 1B:
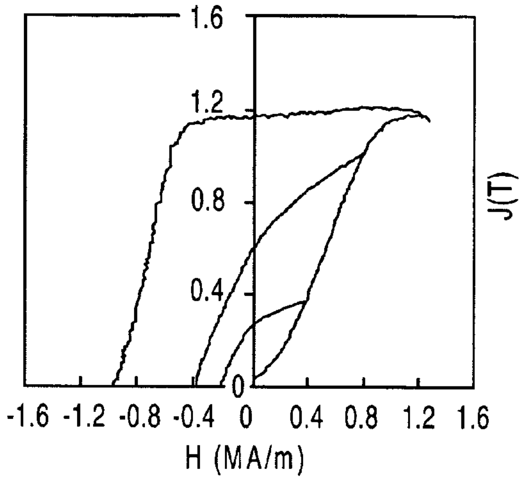
Figure 2:
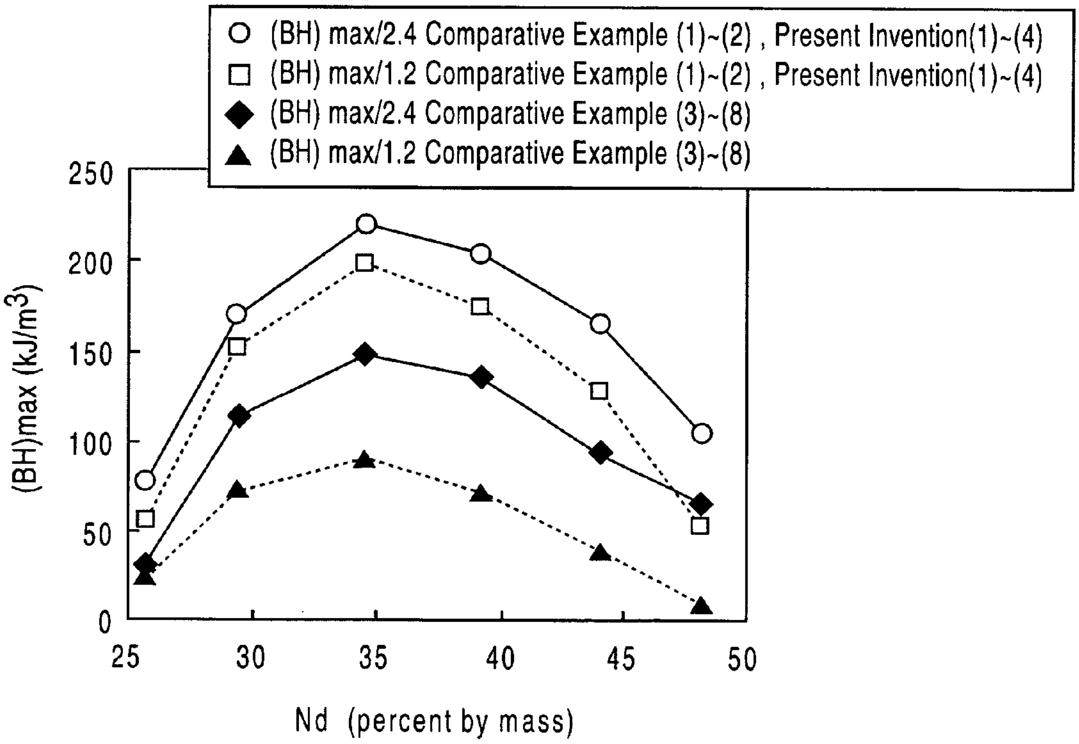
FIG. 2 is a diagram showing the relationship of the amount of Nd with (BH)max of Present invention samples and Comparative example samples.
Figure 3:
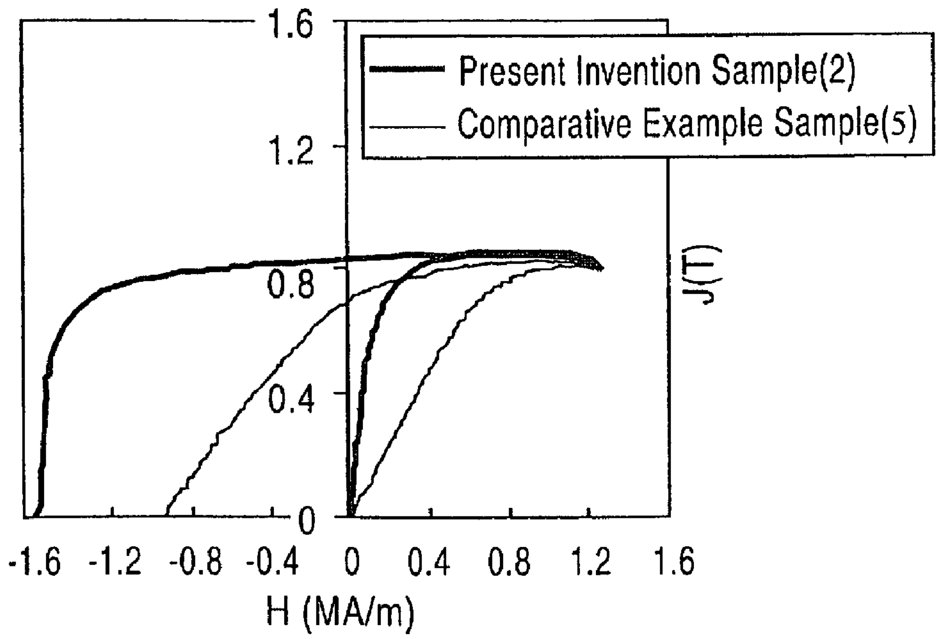
FIG. 3 is a diagram showing initial magnetization curves and demagnetization curves of Present invention sample (2) and Comparative example sample (4).
Figure 4:
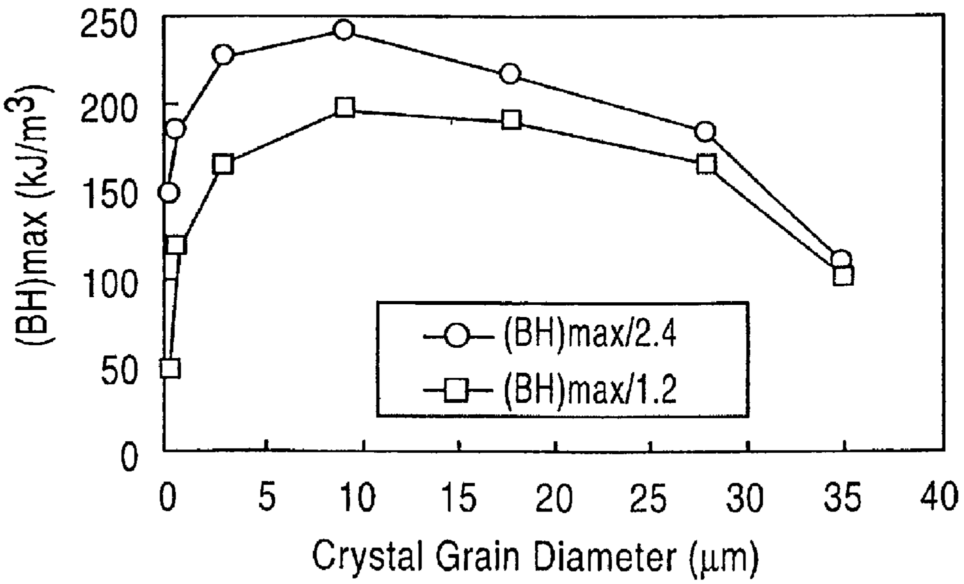
FIG. 4 is a diagram showing the relationship of the crystal grain diameter with (BH)max of Present invention samples and Comparative example samples.
Figure 5:
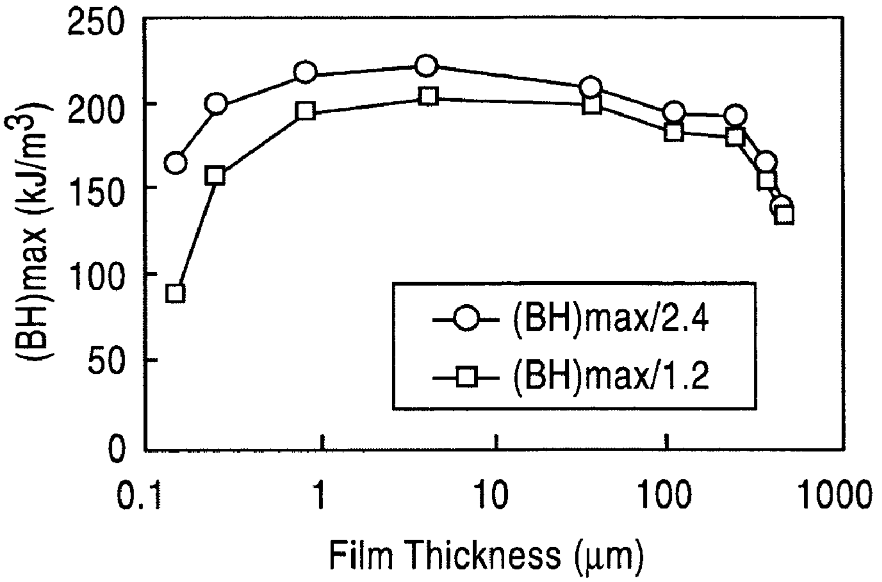
FIG. 5 is a diagram showing the relationship of the film thickness with (BH)max of Present invention samples and Comparative example samples.
Figure 6:
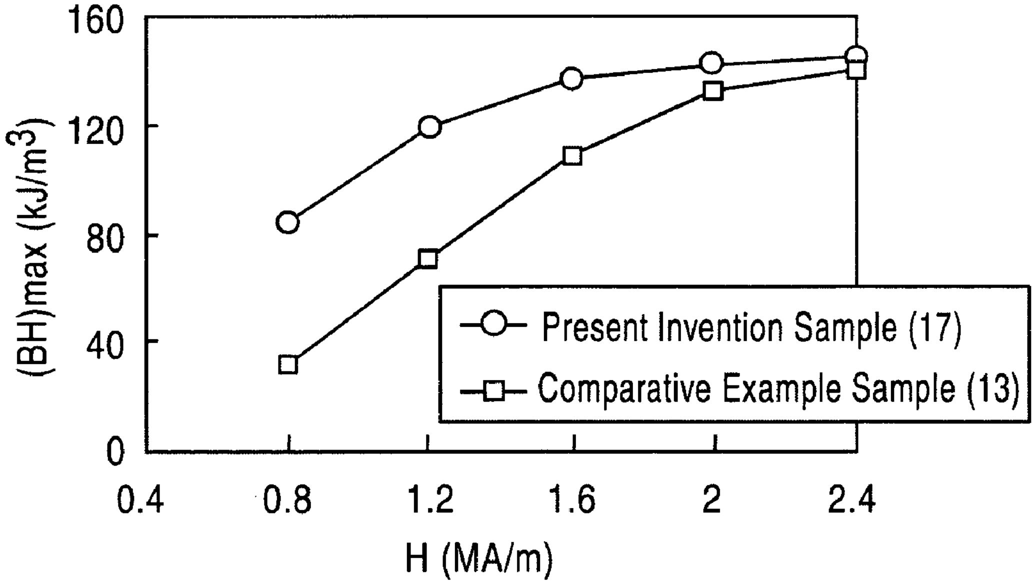
FIG. 6 is a diagram showing the relationship of the magnetic field with (BH)max of Present invention sample (17) and Comparative example sample (13).

The invention claimed is:

1. An R—Fe—B alloy based thin film magnet comprising an R—Fe—B based alloy which contains 28 to 45 percent by mass of R element (where R represents at least one type of rare-earth lanthanide elements) and which is deposited on a base material by a physical film forming method into an alloy film, wherein the alloy film has a thickness is 0.2 to 400 μm, and wherein the R—Fe—B based alloy has a composite texture comprising $R_2Fe_{14}B$ crystals grown by heat treatment of said alloy film and having a crystal grain diameter of 3 to 30 μm which is larger than a single-magnetic-domain grain diameter, wherein a plurality of magnetic domains are present in the crystal grains, and R-element-rich grain boundary phases formed by the heat treatment is present at boundaries between the crystals, and the R—Fe—B alloy has a nucleation type coercive force.

2. The R—Fe—B alloy based thin film magnet according to claim 1, wherein c axes, which are easy-to-magnetize axes, of $R_2Fe_{14}B$ crystals are oriented randomly or oriented nearly perpendicularly to a film surface.

3. A method for preparation of the R—Fe—B alloy based thin film magnet, the method comprising the step of:

forming an alloy film having a thickness of 0.2 to 400 μm by depositing on a base material by a physical film forming method an R—Fe—B based alloy which contains 28 to 45 percent by mass of R element (where R represents at least one type of rare-earth lanthanide elements);

heating the R—Fe—B based alloy in a vacuum or in a non-oxidizing atmosphere to 800° C. to 1,200° C. during physical alloy film formation or/and the following heat treatment, so as to grow crystal grains to diameters of 3 to 30 μm and form R-element-rich grain boundary phases present at boundaries between the crystals, whereby obtaining the R—Fe—B alloy based thin film magnet comprising an R—Fe—B based alloy which contains 28 to 45 percent by mass of R element (where R represents at least one type of rare-earth lanthanide elements) on a base material and which is deposited by a physical film forming method into an alloy film, wherein the alloy film has a thickness is 0.2 to 400 μm, and wherein the R—Fe—B based alloy has a composite texture comprising $R_2Fe_{14}B$ crystals grown by heat treatment of said alloy film and having a crystal grain diameter of 3 to 30 μm which is larger than a single-magnetic-domain grain diameter, wherein a plurality of magnetic domains are present in the crystal grains and R-element-rich grain boundary phases formed by the heat treatment are present at boundaries between the crystals, and the R—Fe—B alloy has a nucleation type coercive force.

* * * * *